(12) United States Patent
Smashey et al.

(10) Patent No.: US 6,491,207 B1
(45) Date of Patent: Dec. 10, 2002

(54) WELD REPAIR OF DIRECTIONALLY SOLIDIFIED ARTICLES

(75) Inventors: Russell W. Smashey, Batavia, OH (US); John H. Snyder, Fairfield, OH (US); Bruce L. Borne, Florence, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/459,302

(22) Filed: Dec. 10, 1999

(51) Int. Cl.[7] .......................... B23K 31/00; B23K 31/02
(52) U.S. Cl. ...................... 228/119; 228/228; 228/248.5
(58) Field of Search ................................ 228/119, 228, 228/248.5, 262.31, 225, 226, 248.1, 262.3

(56) References Cited

U.S. PATENT DOCUMENTS

| | | | |
|---|---|---|---|
| 4,336,312 A | | 6/1982 | Clark et al. .................. 428/680 |
| 4,673,123 A | * | 6/1987 | Shin et al. .............. 228/263.13 |
| 4,726,104 A | * | 2/1988 | Foster et al. ........... 29/156.8 B |
| 4,878,953 A | | 11/1989 | Saltzman et al. ............... 148/4 |
| 5,040,718 A | * | 8/1991 | Lee et al. .................... 228/119 |
| 5,071,054 A | * | 12/1991 | Dzugan et al. .............. 228/119 |
| 5,156,321 A | * | 10/1992 | Liburdi et al. ............... 228/119 |
| 5,374,319 A | | 12/1994 | Stueber et al. .............. 148/404 |
| 5,732,467 A | * | 3/1998 | White et al. ................ 29/889.1 |
| 5,806,751 A | * | 9/1998 | Schaefer et al. ............. 228/119 |
| 5,897,801 A | * | 4/1999 | Smashey et al. ..... 219/137 WM |
| 6,049,060 A | * | 4/2000 | Smashey et al. ........ 219/137 R |
| 6,195,891 B1 | * | 3/2001 | Chen et al. ................. 29/889.1 |
| 6,213,192 B1 | * | 4/2001 | Smashey et al. .......... 164/122.1 |

\* cited by examiner

*Primary Examiner*—M. Alexandra Elve
(74) *Attorney, Agent, or Firm*—David L. Narciso; Gregory O. Garmong

(57) ABSTRACT

A directionally solidified nickel-base superalloy article has a defect therein extending parallel to the solidification direction. The article is repaired by removing any foreign matter present in the defect, and then heating the article to a repair temperature of from about 60 to about 98 percent of the solidus temperature of the base material in a chamber containing a protective gas that inhibits oxidation of the base material. The defect is filled with a filler metal while maintaining the article at the repair temperature. The filling is accomplished by providing a source of the filler metal of substantially the same composition as the base material of the directionally solidified article, and melting the filler metal into the defect progressively while moving the source of the filler metal relative to the article in a direction parallel to the solidification direction. Optionally, additional artificial heat extraction is accomplished in a heat-flow direction that is within about 45 degrees of the solidification direction, as the filler metal solidifies within the defect. The article may thereafter be heat treated.

11 Claims, 5 Drawing Sheets

WELD REPAIR OF DIRECTIONALLY SOLIDIFIED ARTICLES

The invention herein described was made in the performance of work under a NASA contract and is subject to the provisions of Section 305 of the National Aeronautics and Space act of 1958, Public Law 85-568 (72 Stat. 435; 42 USC 2457).

This invention relates to the weld repair of articles having an oriented grain structure produced by directional solidification, and, more particularly, to the weld repair of directionally solidified nickel-base superalloys.

BACKGROUND OF THE INVENTION

Metallic articles may be made with a directionally solidified grain structure to enhance their mechanical properties at elevated temperatures. In directional solidification, molten metal in a mold defining the shape of the article is cooled unidirectionally from one end of the mold. The metal solidifies first at the end from which heat is removed, and then along the length of the mold as the temperature falls below the solidus temperature. The resulting structure has a number of grains that are elongated along the length of the mold parallel to the heat flow direction. The grain boundaries are parallel to the heat flow direction as well. The grains typically exhibit an oriented grain structure according to the fastest growing crystallographic direction or a seeded orientation introduced at the end first solidified. The grain orientation is selected to achieve good high temperature properties.

In service, the article made by directional solidification is positioned such that the major mechanical loading is applied parallel to the heat flow direction during solidification. The orientation of the grain structure parallel to the heat flow direction places the greatest material strength in this direction. Additionally, the orientation of the grain boundaries parallel to the heat flow direction reduces the incidence of grain boundary creep. Directional solidification is used to fabricate cast articles of nickel-base superalloys to be used in the hottest portions of aircraft gas turbine engines.

When the article is directionally solidified, there may be casting defects, both of types common to all casting processes and also of types unique to directional solidification. These defects are often manifested as cracks, particularly intergranular cracks, that extend parallel to the direction of the solidification. There may be other types of defects produced during solidification and also during service.

The directionally solidified articles are relatively expensive to produce. It is therefore desirable to repair the defects produced during casting or service, if such repair is feasible. In one approach, the defect may be repaired by a welding process, in which the defect is filled with a filler metal and solidified, or by other filling procedures. Such techniques are known for equiaxed articles. However, when applied to directionally solidified articles, the result is an inadequate repair that has an inhomogeneous microstructure and whose mechanical properties are unacceptably low. The repaired article may also tend to be of less ductility than the defect-free article.

There is a need for an improved approach to the repair of directionally solidified metallic articles. The present invention fulfills this need, and further provides related advantages.

BRIEF SUMMARY OF THE INVENTION

The present invention provides a method for repairing directionally solidified articles. This approach produces a chemically homogeneous structure, and a grain structure that is oriented similarly to that of the remainder of the article. The result is that the repaired article has properties which are the same as or quite close to those of the defect-free portion of the article. The repaired article may therefore be used in service without substantial reduction in properties as compared with a defect-free article.

A method for repairing a directionally solidified article comprises the steps of furnishing a directionally solidified article comprising a base material having a solidus temperature and having a repair region with a grain structure of grains elongated substantially parallel to a solidification direction. The repair region includes a defect that is elongated parallel to the solidification direction. The article is heated to a repair temperature of from about 60 to about 98 percent of the solidus temperature, preferably from about 60 to about 80 percent of the solidus temperature, of the base material in a chamber containing a protective gas that inhibits oxidation of the base material. The defect is filled with a filler metal while maintaining the article at the repair temperature. The step of filling includes the steps of providing a source of a filler metal of substantially the same composition as the base material of the directionally solidified article, and melting the filler metal into the defect progressively while moving the source of the filler metal relative to the article in a direction parallel to the solidification direction, so that the filler metal solidifies within the defect. Optionally, heat may be artificially extracted from the article in a heat-flow direction that is within about 45 degrees of the solidification direction.

The article is preferably made of a nickel base superalloy. The defect in the article is typically a crack extending parallel to the solidification direction, and more typically is an intergranular crack. The invention is also operable to repair other types of defects as well. Prior to heating, it is preferred to remove any foreign matter present in the defect. The removal of the foreign matter is usually accomplished by grinding away base material around the defect, creating a cavity that is to be filled with the filler metal, and chemically cleaning the repair region containing the defect.

The present approach produces a repaired region in which the original defect is filled with the same material as the base metal of the article. The heating of the article to a high temperature during the filling of the defect reduces the incidence of incompatibility between the filler metal and the base metal, and also reduces the likelihood of failures of the base metal due to low ductility of the base metal in intermediate temperature ranges.

The grain structure of the repaired region that originally contained the defect is similar to that of the rest of the article. The grain structure of the repaired region has grains of the base-metal composition oriented parallel to the original heat flow direction, and the grain boundaries are also parallel to the heat flow direction. The grain size may be different, but the oriented grain structure of the repaired region results in no impairment of properties as might be observed if the grain structure in the repaired region were equiaxed or had grain boundaries perpendicular to the original heat flow direction.

The present approach thus allows defects in as-cast or service-utilized directionally solidified articles to be repaired with very little, if any, reduction in the properties of the articles. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
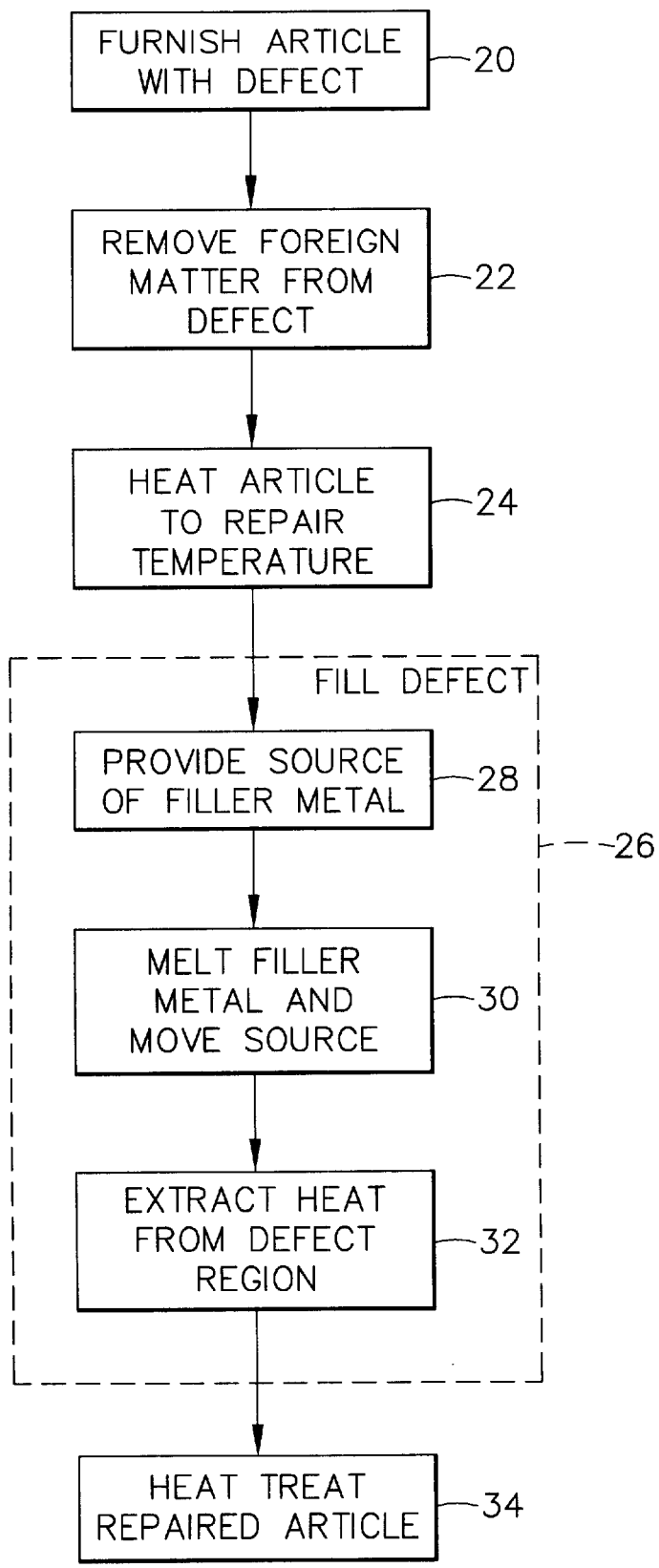
FIG. 1 is a block flow diagram of an approach for practicing the invention.
Figure 2:
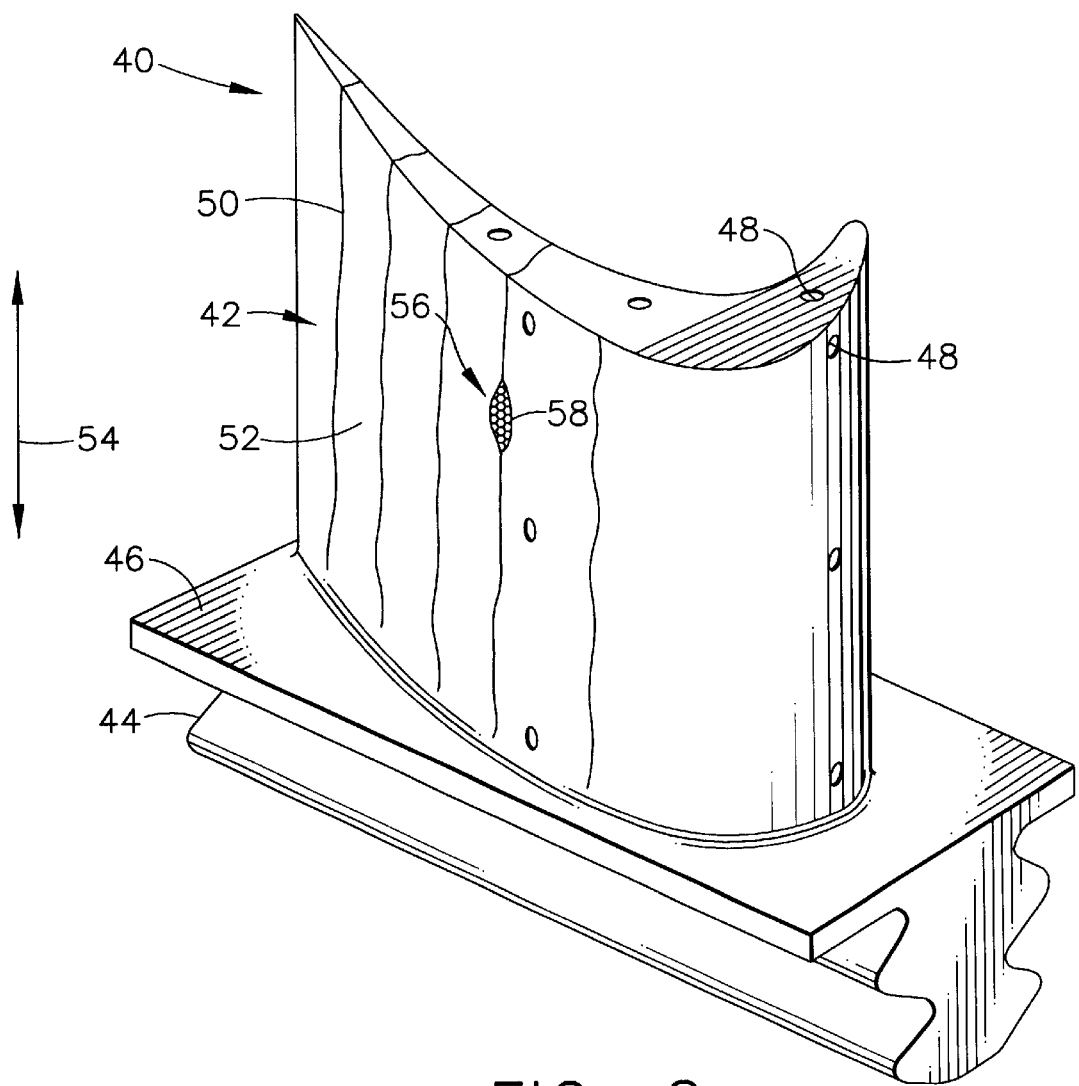
FIG. 2 is a perspective view of an article having a defect.
Figure 7:
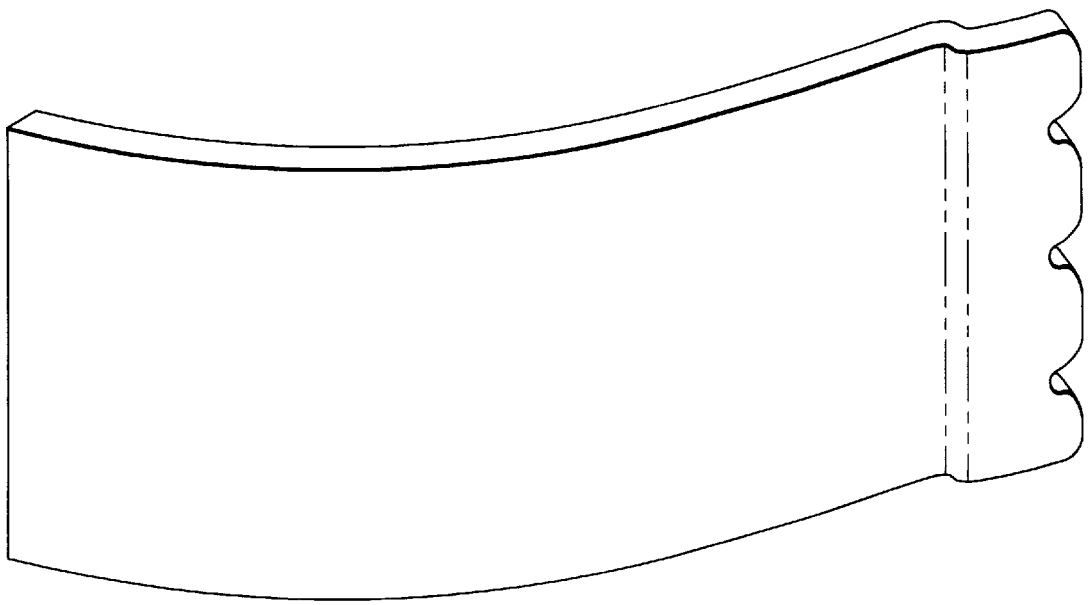
FIG. 7 is a perspective view of a typical inner or outer duct liner panel.

FIG. 1 is a block flow diagram of a preferred approach for practicing the invention. A directionally solidified article is furnished, numeral 20. FIG. 2 illustrates such a directionally solidified article 40, in this case a turbine blade for a gas turbine engine. The turbine blade 40 includes an airfoil 42 against which the flow of hot exhaust gas is directed when the turbine blade is in service in a gas turbine engine. The turbine blade 40 is mounted to a turbine disk (not shown) by a dovetail 44 which extends downwardly from the airfoil 42 and engages a slot on the turbine disk. A platform 46 extends longitudinally outwardly from the area where the airfoil 42 is joined to the dovetail 44. A number of internal passages may extend through the interior of the airfoil 42, ending in openings 48 in the surface of the airfoil 42. All or portions of the article 40 may be coated with a protective coating. The present invention is operable with turbine blades, the preferred application, and with other directionally solidified articles as well. Examples of other articles used in gas turbine engines include turbine vanes, mixer nozzles, inner and outer transition duct liner panels, and transition duct struts. FIG. 7 depicts a typical inner or outer duct liner panel.

The turbine blade 20 is made of a metallic alloy base material that is preferably, but not necessarily, a nickel-base superalloy. The preferred alloy is nickel-base, meaning that it has more nickel by weight percent than any other element. The preferred nickel-base alloy is a superalloy, and is strengthened by precipitation of gamma prime (typically $Ni_3(Al,Ti)$) particles in a gamma matrix. The alloy has a solidus temperature, which is the temperature at which, upon heating a solid material having the composition of the alloy, a liquid phase first appears. The invention is operable with other alloys as well.

Examples of preferred nickel-base superalloys operable with the present approach include Rene 80H, having a nominal composition, in weight percent, of about 9.5 percent cobalt, about 14 percent chromium, about 4 percent molybdenum, about 4 percent tungsten, about 3 percent aluminum, about 5 percent titanium, about 0.75 percent hafnium, about 0.2 percent carbon, and about 0.015 percent boron, balance nickel and impurities; Rene 108, having a nominal composition, in weight percent, of about 9.4 percent cobalt, about 8.2 percent chromium, about 0.5 percent molybdenum, about 9.5 percent tungsten, and 3.2 percent tantalum, about 5.6 percent aluminum, about 0.7 percent titanium, about 1.5 percent hafnium, about 0.1 percent carbon, about 0.015 percent boron, balance nickel and impurities; Rene 150, having a nominal composition, in weight percent, of about 12 percent cobalt, about 5 percent chromium, about 1 percent molybdenum, about 5 percent tungsten, about 2.2 percent vanadium, about 6 percent tantalum, about 5.5 percent aluminum, about 3 percent iron, balance nickel and impurities; Rene 142, having a nominal composition, in weight percent, of about 12 percent cobalt, about 6.8 percent chromium, about 1.5 percent molybdenum, about 4.9 percent tungsten, about 6.4 percent tantalum, about 6.2 percent aluminum, about 2.8 percent iron, about 1.5 percent hafnium, about 0.1 percent carbon, about 0.015 percent boron, balance nickel and impurities; and Mar-M247, having a nominal composition, in weight percent, of about 10.3 percent cobalt, about 8.4 percent chromium, about 0.75 percent molybdenum, about 9.9 percent tungsten, about 3.1 percent tantalum, about 5.5 percent aluminum, about 1 percent titanium, about 1.5 percent hafnium, about 0.2 percent carbon, balance nickel and impurities. The present invention is operable with other alloys as well.

The article 40 is initially prepared by directional solidification. The result of the directional solidification processing, which process is well known in the art, is a plurality of grain boundaries 50 extending lengthwise through the article 40, separating grains 52. The grains 52 are oriented with a preferred crystallographic direction, such as [001] in the case of most nickel-base superalloys, parallel to a solidification direction 54. The grain boundaries 50 are also parallel to the solidification direction 54. These grain boundaries 50 are visible on the surface of the article 40, and penetrate its interior. The crystallographic directions of the grains 52 and the grain boundaries 50 need not be exactly parallel to the solidification direction 54, but are typically within about 15 degrees of the solidification direction. The article 40 may also include some grains and grain boundaries that are not parallel to the solidification direction 54, particularly in irregular areas such as the platform 46.

The article 40 has a repair region 56, where the grains 52 are elongated substantially parallel to the solidification direction 54 in the manner described. The repair region 56 includes a defect 58. The most common type of defect 58, which will be discussed in greater detail herein, is a crack which extends inwardly from the surface and which is elongated parallel to the solidification direction 54. The defect 58 is typically intergranular, that is, in the grain boundary 50 between two adjacent grains 52. Such an intergranular crack may be formed during the directional solidification casting procedure in which the article 40 is cast, or it may be formed during service. The invention is also operable to repair other types of defects. Examples of such defects include those that are formed generally during casting, such as inclusions, regions of non-fill, and porosity, and defects that are associated more directly with directional solidification processes, such as freckles and spurious grain nucleation. Service defects include, for example, impact events, corrosion, and hot streaks.

The defect 58 typically has various types of foreign matter embedded in the region 56 of the defect, such as along the sides of an intergranular crack. The foreign matter may include, for example, oxides, impurity particles, and the like. Where such foreign matter is present, it is preferably removed from the region 56 of the defect 58 prior to the subsequent steps of the repair process, numeral 22. The foreign matter, if not removed, might interfere with the filling of the defect and also leave the repaired defect weak. The removal of the foreign matter is preferably accomplished by grinding the base metal of the article 40 away on the sides of the defect 58, typically to a width of at least about twice as wide as the original width of the defect 58. The region 56 containing the defect may also be chemically cleaned, as by using an acid to remove a layer at the surface of the region 56. The result of the removal of foreign matter is usually a larger volume of material to be filled than the size of the original defect, but for the present purposes the volume will still be termed the defect.

The article is heated to a repair temperature, numeral 24. The subsequent filling operation must be performed at the elevated repair temperature. The filling operation may not be performed at room temperature or a lower temperature than that specified next for the repair temperature, or the repair will not be successful. The repair temperature is from about 60 to about 98 percent of the solidus temperature, preferably from about 60 to about 80 percent of the solidus temperature, of the alloy base material that makes up the article 40. If the repair temperature is lower, the subsequent filling operation will not be successful and/or the final repaired article will not have adequate properties. The repair temperature cannot be higher, as the article will be at risk for incipient melting.

During the subsequent filling operation, the temperature of the region 56 containing the defect 58 may be locally higher because of the filler metal being melted into the defect 58. The "repair temperature" specified above refers to the temperature of the bulk base material of the article 40 near to the defect 58 produced by a general heating of the article, but not within the defect 58.

The article 40 is generally heated in a welding chamber, by any operable approach. The welding chamber surrounds the article with a protective gas that inhibits oxidation of the article 40 during the filling procedure. The preferred protective gas is argon at a pressure slightly above one atmosphere, to prevent leakage into the chamber. The protective gas may permit some small amount of oxidation, but the amount of oxidation is greatly reduced as compared with the amount that would occur in the absence of the protective gas. The welding chamber is preferably a glove box operating at a slight positive pressure (typically about 1–2 pounds per square inch above atmospheric pressure) of the inert gas processed as just described to achieve high purity. The interior of the glove box is preheated prior to the start of welding to outgas oxygen, moisture, and other residual gases.

In the preferred case of welding under a high-purity inert argon gas, care is taken to maintain the oxygen content of the inert gas at less than about 1 part per million (ppm), because residual oxygen strongly oxidizes alloying elements in the nickel-base superalloy, to reduce the weld quality. For the same reason, the moisture content of the inert gas is maintained very low, with the dew point of the inert gas of less than about −80° F. The oxygen and moisture contents may be maintained at these low levels by passing the inert gas through a nickel-train gas purifier operated at 1600° F. before it enters the welding chamber, and continuously monitoring the oxygen content of the inert gas.

The defect 58 (as modified by the removal of foreign matter) is filled with a filler metal while the article 40 is maintained generally at the repair temperature, numeral 26. In the filling process, a source of a filler metal is provided, numeral 28. The filler metal is of substantially the same composition as the metallic base material from which the article 40 is formed generally. However, minor variations in composition are acceptable. The objective of the filling process is to fill the defect with a metal of about the same composition as the metallic base material, and also to achieve a directionally oriented grain structure. The filler metal may be in any operable form. Preferred forms include weld rod and powder.

Figure 3:
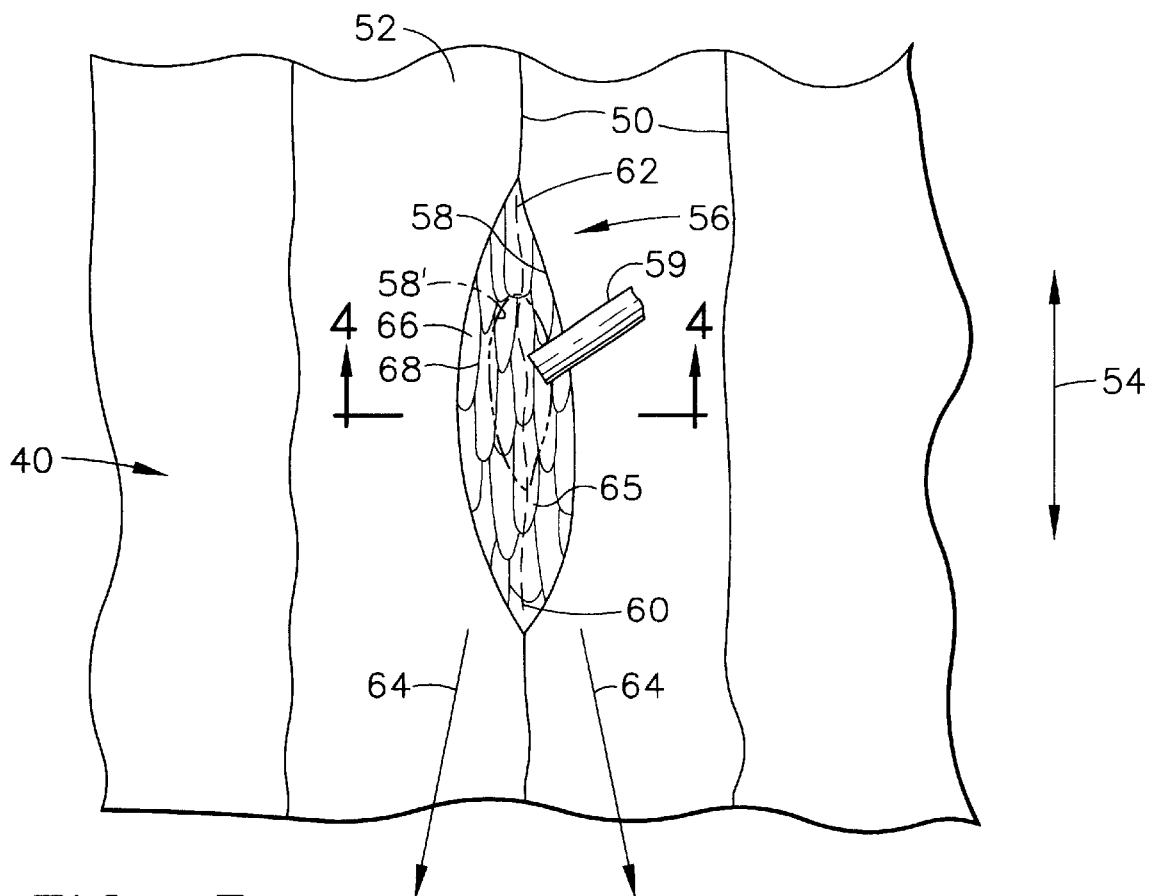
FIG. 3 is a plan view of the article undergoing repair.
Figure 4:
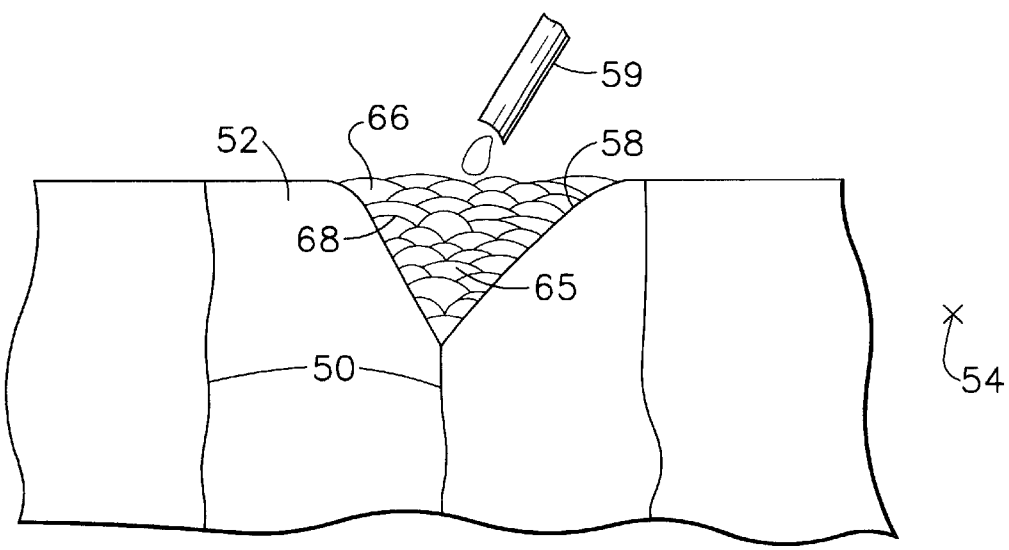
FIG. 4 is a sectional view of the article of FIG. 3, taken along line 4—4.

FIGS. 3 and 4 illustrate the repair region 56 in greater detail. In FIG. 3, the original defect is indicated as numeral 58', and the defect after removal of foreign matter (step 22) is indicated as numeral 58. A source 59 of the filler metal is melted into the defect 58 progressively while moving the source 59 of the filler metal relative to the article 40 in a direction parallel to the solidification direction 54. In the illustration of FIG. 3, the source of the filler metal starts at a first end 60 of the defect 58, and is gradually moved parallel to the solidification direction 54 to a second end 62. This relative motion may be accomplished by keeping the article 40 stationary and moving the source 59, keeping the source 59 stationary and moving the article 40, or any combination of these movements.

The source 59 of the filler metal is gradually melted by any appropriate heating technique, numeral 30. In the case of the illustrated weld rod source, the source 59 may be melted by an electric arc struck between the source 59 and the article 40, by forming an arc between an electrode and the article and feeding the filler metal into the arc, by laser melting, by a separate heat source, or by any other operable heat source. In the case of a powder source 59, the heating may be accomplished by a plasma spray or any other operable heat source.

The molten filler metal forms a pool that fills the volume of the defect 58. At the same time, heat is extracted, numeral 32, from the article 40 in a heat-flow direction 64, or multiple heat flow directions. The heat-flow direction 64 is desirably parallel to the solidification direction 54 and opposite to the relative movement of the source 59 relative to the article 40. That is, if the source 59 moves from the first end 60 toward the second end 62, the heat flow direction is from the first end 60 in a direction away from the second end 62. The heat flow direction 64, while preferably parallel to the solidification direction 54, may deviate from the solidification direction 54 by as much as about 45 degrees.

However, the greater the deviation of the heat flow direction 64 from the solidification direction 54, the less desirable is the final structure of the repaired defect. The extraction of heat causes the filler metal to progressively solidify as a deposit of filler metal 65 within the volume of the defect 58, from the first end 60 toward the second end 62. The directional heat extraction in the heat-flow direction 64 occurs naturally as a result of the relative movement of the source 59 of filler metal. Optionally, the heat extraction may be artificially aided and accelerated with the use of coolants such as a flow of cooling gas impinging on the surface of the article 40 or a chill block, placed such that heat extraction is accelerated along the heat-flow direction 64.

FIGS. 3 and 4 illustrate the grain structure that results from this controlled weld-repair process. The filler metal has an oriented grain structure, comprising grains 66 within the repaired defect extending from the first end 60 toward the second end 62. The preferred orientation of the grains 66 is parallel or nearly parallel to the solidification direction 54, and thence parallel to the preferred orientation within the grains 52 of the base metal of the article 40. The grain boundaries 68 of the grains 66 within the repaired defect 58 are parallel or nearly parallel to the solidification direction 54, and thence to the grain boundaries 50 of the base metal.

This repaired structure is substantially homogeneous in composition, as the filler metal that fills the defects 58 is substantially of the same composition as the metallic base material of the article 40. The grains, including both the grains 52 of the base article 40 and the grains 66 of the repaired region 56, are largely oriented with their preferred directions parallel to the solidification direction 54. The grain boundaries, including both the grain boundaries 50 of the base material and the grain boundaries 68 of the repaired region 56, are largely oriented parallel to the solidification direction 54. The result of this homogeneity of composition and uniformity of orientation is that the repaired article has properties that are the same as, or quite close to, an article that has no defects or repaired regions.

After the filling step 26, the article 40 may optionally be heat treated, numeral 34. The heat treatment, where used, is normally selected to provide the optimum structure for the properties desired in the final article. Accordingly, the selected heat treatment is associated with the specific alloy that has been repaired. For example, the article may be solution treated and aged, and/or stress relieved, according to procedures specific to the alloy.

Figure 5:
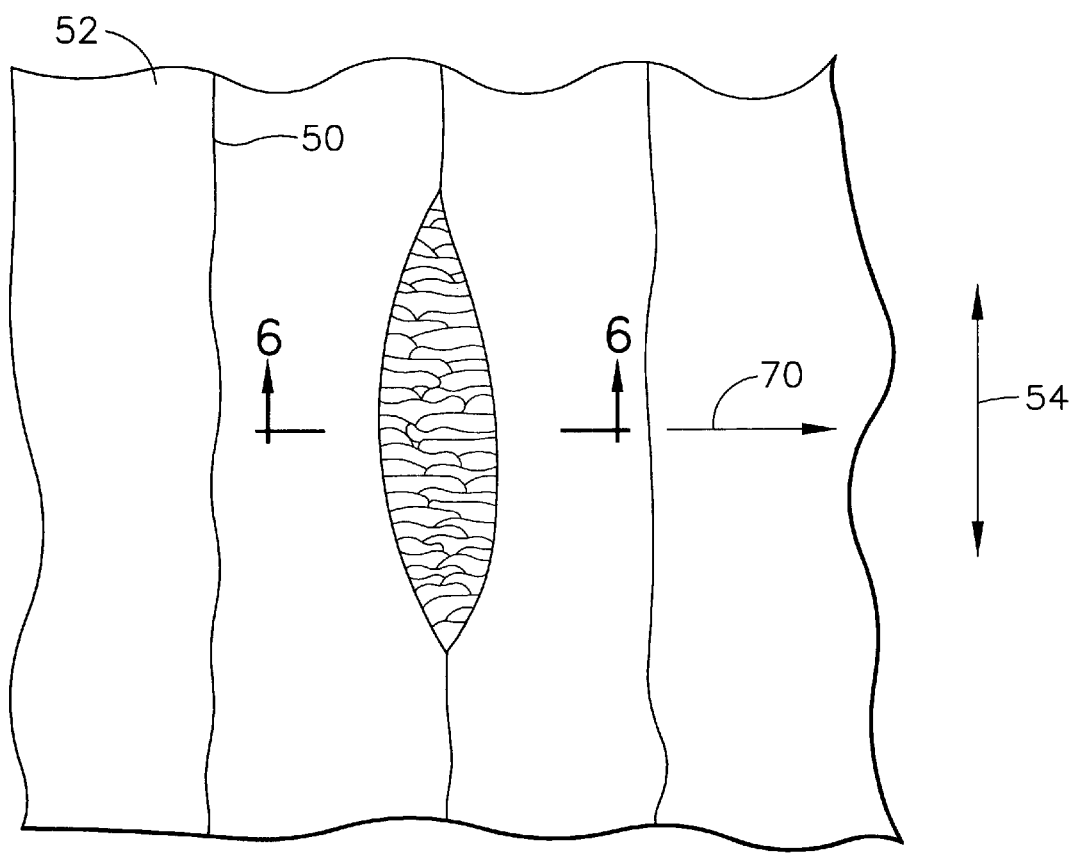
FIG. 5 is a plan view of an article repaired by another approach, not within the scope of the invention.
Figure 6:
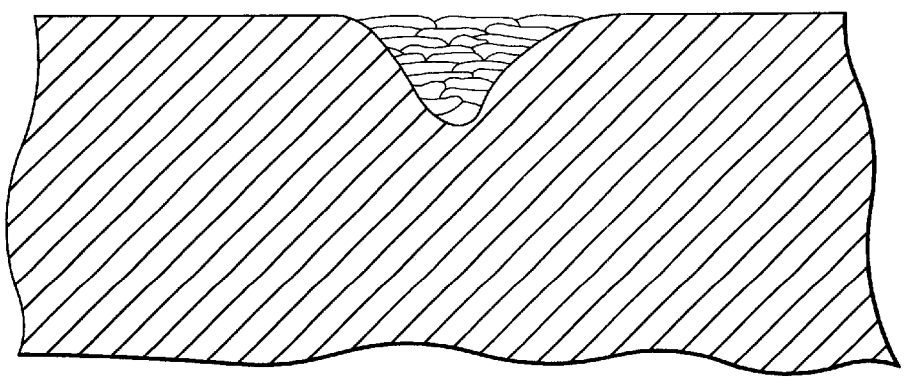
FIG. 6 is a sectional view of the article of FIG. 5, taken along line 6—6.

This structure is superior to one where the composition of the filler metal is substantially different from that of the base metal, and where the heat flow direction is not controlled so that heat flow is primarily generally along the solidification direction 54. As shown in FIGS. 5 and 6, where a heat flow direction 70 is perpendicular to the solidification direction 54, the grains in the repaired defect are also generally perpendicular to the solidification direction 54. The result is that, if the composition of the filler metal is different from that of the base metal, there is an inhomogeneity in strength, corrosion, and other properties. Because the heat flow direction is perpendicular to the solidification direction, the grains in the repaired defect are oriented so that the grain boundaries are perpendicular to the solidification direction 54 and thence to the main load axis of the article in service. This orientation can lead to premature failure. An equiaxed grain structure in the repaired defect would also suffer from this problem.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for repairing a directionally solidified article, comprising the steps of:

furnishing a directionally solidified article comprising a base material having a solidus temperature and having a repair region with a grain structure of grains elongated substantially parallel to a solidification direction, the repair region including a defect that is elongated parallel to the solidification direction;

heating the article to a repair temperature of from about 60 to about 98 percent of the solidus temperature of the base material in an atmosphere of a protective gas that inhibits oxidation of the base material;

filling the defect with a filler metal while maintaining the article at the repair temperature, the step of filling including the steps of providing a source of a filler metal of substantially the same composition as the base material of the directionally solidified article, and melting the filler metal into the defect progressively while moving the source of the filler metal relative to the article in a direction parallel to the solidification direction; and artificially extracting heat from the article in a heat-flow direction that is within about 45 degrees of the solidification direction, so that the filler metal solidifies within the defect, wherein the step of artificially extracting is performed simultaneously with the step of melting the filler metal.

2. The method of claim 1, wherein the step of furnishing includes the step of furnishing a nickel base superalloy.

3. The method of claim 1, wherein the step of furnishing includes the step of furnishing a nickel base superalloy having a composition, in weight percent, selected from the group consisting of Rene 80H, having a nominal composition, in weight percent, of about 9.5 percent cobalt, about 14 percent chromium, about 4 percent molybdenum, about 4 percent tungsten, about 3 percent aluminum, about 5 percent titanium, about 0.75 percent hafnium, about 0.2 percent carbon, and about 0.015 percent boron, balance nickel and impurities; Rene 108, having a nominal composition, in weight percent, of about 9.4 percent cobalt, about 8.2 percent chromium, about 0.5 percent molybdenum, about 9.5 percent tungsten, about 3.2 percent tantalum, about 5.6 percent aluminum, about 0.7 percent titanium, about 1.5 percent hafnium, about 0.1 percent carbon, about 0.015 percent boron, balance nickel and impurities; Rene 150, having a nominal composition, in weight percent, of about 12 percent cobalt, about 5 percent chromium, about 1 percent molybdenum, about 5 percent tungsten, about 2.2 percent vanadium, about 6 percent tantalum, about 5.5 percent aluminum, about 3 percent iron, balance nickel and impurities; Rene 142, having a nominal composition, in weight percent, of about 12 percent cobalt, about 6.8 percent chromium, about 1.5 percent molybdenum, about 4.9 percent tungsten, about 6.4 percent tantalum, about 6.2 percent aluminum, about 2.8 percent iron, about 1.5 percent hafnium, about 0.1 percent carbon, about 0.015 percent boron, balance nickel and impurities; and Mar-M247, having a nominal composition, in weight percent, of about 10.3 percent cobalt, about 8.4 percent chromium, about 0.75 percent molybdenum, about 9.9 percent tungsten, about 3.1 percent tantalum, about 5.5 percent aluminum, about 1 percent titanium, about 1.5 percent hafnium, about 0.2 percent carbon, balance nickel and impurities.

4. The method of claim 1, wherein the defect is a crack extending parallel to the solidification direction.

5. The method of claim 1, including an additional step, prior to the step of heating, of removing any foreign matter present in the defect.

6. The method of claim 5, wherein the step of removing includes the step of removing foreign matter from the region of the defect by grinding away material around the defect.

7. The method of claim 5, wherein the step of removing includes the step of removing foreign matter from the region of the defect by grinding away material around the defect to a width of at least about 2 times a width of the defect.

8. The method of claim 5, wherein the step of removing includes the step of chemically cleaning the repair region containing the defect.

9. The method of claim 1, including an additional step, after the step of filling, of heat treating the article with the repaired defect.

10. A method for repairing a directionally solidified article, comprising the steps of:

furnishing a directionally solidified article comprising a nickel-base superalloy base material having a solidus temperature and having a repair region with a grain structure of grains elongated substantially parallel to a solidification direction, the repair region including an intergranular crack that is elongated parallel to the solidification direction;

removing any foreign matter present in the defect;

heating the article to a repair temperature of from about 60 to about 98 percent of the solidus temperature of the base material in a chamber containing a protective gas that inhibits oxidation of the base material;

filling the defect with a filler metal while maintaining the article at the repair temperature, the step of filling including the steps of providing a source of a filler metal of substantially the same composition as the base material of the directionally solidified article, and melting the filer metal into the defect progressively while moving the source of the filler metal relative to the article in a direction parallel to the solidification direction; and artificially extracting heat from the article in a heat-flow direction that is within about 45 degrees of the solidification direction, so that the filler metal solidifies within the defect, wherein the step of artificially extracting is performed simultaneously with the step of melting the filler metal.

11. The method of claim 10, including an additional step, after the step of filling, of heat treating the article with the repaired defect.

* * * * *